United States Patent [19]

Guyton et al.

[11] 3,805,289

[45] Apr. 16, 1974

[54] TAPE CARTRIDGE RETAINING AND EJECTING MECHANISM

[75] Inventors: James H. Guyton; Larry W. Taylor, both of Kokomo, Ind.

[73] Assignee: General Motors Corporation, Detroit, Mich.

[22] Filed: Mar. 1, 1973

[21] Appl. No.: 337,128

Related U.S. Application Data

[63] Continuation of Ser. No. 129,387, March 30, 1971.

[52] U.S. Cl. .................................................. 360/93
[51] Int. Cl. ............................................ G11b 5/00
[58] Field of Search........................... 274/4 B, 11 B; 179/100.2 Z

[56] References Cited

UNITED STATES PATENTS

| | | | |
|---|---|---|---|
| 3,485,500 | 12/1969 | Loeschner et al. | 274/4 B |
| 3,575,421 | 4/1971 | Kato | 274/4 B |
| 3,578,338 | 5/1971 | Ueno | 274/4 B |
| 3,221,963 | 12/1965 | Andersen | 274/4 F |
| 3,431,367 | 3/1969 | Nickl | 274/4 F |

*Primary Examiner*—Harry N. Haroian
*Attorney, Agent, or Firm*—T. G. Jagodzinski

[57] ABSTRACT

In a preferred form, a tape cartridge retaining and releasing mechanism for tape players includes a retention lever pivotally mounted on a resilient arm which extends along one side of a cartridge receiving chamber. A remotely operated actuator acting through a linkage arrangement shifts the retention lever and a cartridge inserted into the chamber between two locked positions corresponding to cartridge play and eject locations, respectively. At the latter location, the mechanism is conditioned so that the cartridge can be removed or directly repositioned to the play location.

7 Claims, 9 Drawing Figures

TAPE CARTRIDGE RETAINING AND EJECTING MECHANISM

This is a Continuation of Ser. No. 129,387, filed Mar. 30, 1971.

BACKGROUND OF THE INVENTION

This invention relates to a tape cartridge retaining and ejecting mechanism and more particularly to a tape cartridge retaining and ejecting mechanism for tape players adapted to receive a tape cartridge in which the mechanism locks a cartridge at both play and eject locations and shifts the cartridge from one of the locations to the other.

Many of the cartridge type tape players presently being made are intended for portable use or mounting in automobile type vehicles. In these instances the tape players are susceptible to impact and vibrations not usually associated with players intended solely for the home use. It is therefore desirable to not only securely lock the cartridge in the tape player at a normal play location but to also lock the cartridge at an eject location upon being released from the former location. It is known that extended storage of a cartridge in the play location may cause deformation and damage to the magnetic tape and tape engaging parts of the tape player.

It is also often desirable to have the cartridge fully insertable into the tape player housing when at the play location so that the end of the cartridge is concealed or not substantially exposed. However, this presents difficulty in manually grasping and extracting a cartridge from the tape player. In such arrangements it is usually necessary to remotely expel the cartridge to an eject location where the cartridge is only partially inserted into the tape player and is positioned for removal or reinsertion.

SUMMARY OF THE INVENTION

In accordance with the present invention, a tape cartridge retaining and ejecting mechanism for tape players having a cartridge receiving chamber includes a retention lever extending across a sidewall of the chamber. The retention lever is movably supported on a resilient arm extending along the sidewall. An inner end of the retention lever carries a roller that engages the index notch of a tape cartridge inserted into the chamber. The retention lever acts solely on the index notch and is movable between first and second overcenter detent states for positioning and locking the tape cartridge at play and eject locations, respectively. The spring force of the resilient arm locks the retention lever in either of the two overcenter detent states. A remotely operated actuator mounted adjacent the chamber sidewall is connected to the outer end of the lever by a linkage arrangement. The actuator is operable through the linkage arrangement to move the lever so as to initially drive the cartridge from the play location and shift the retention lever past a neutral or equilibrium position. The spring force of the resilient arm is then effective to further drive the cartridge to the eject location. When the cartridge is at the eject location, the mechanism is conditioned for either removal of the cartridge or reinsertion in the chamber. Removal of the cartridge releases the resilient arm so that the actuator and linkage arrangement reset the retention lever for initially receiving the cartridge into the chamber and locking it at the play location.

An object of this invention is to provide a tape cartridge retaining and releasing mechanism that is compact and made of a few simple components wherein a retention lever has two overcenter detent states to hold a tape cartridge at either of two locked locations and wherein the retention lever acts against the inclined edges of the cartridge index notch to move the cartridge from one of the locked locations to the other so as to release te cartridge from the tape driving parts while securely retaining it in the tape player.

Another object of this invention is to provide a tape cartridge retaining and ejecting mechanism or a tape player having a cartridge receiving chamber adapted to receive a tape cartridge of the type having an index notch wherein a retention lever has an inner lever arm extending into said chamber and is supported on the free end of a cantilevered resilient arm so that the inner lever arm engages the cartridge index notch by moving the free end to develop a reaction spring force in the resilient arm, and wherein the retention lever and the resilient arm develop a cooperative toggling action to bias the retention lever into either of two overcenter detent states when the inner lever arm is positioned on either side of a neutral or equilibrium position.

A further object of this invention is to provide a tape cartridge retaining and ejecting mechanism for a tape player having a cartridge receiving chamber wherein a resilient arm is mounted in a cantilevered fashion along one of the chamber sidewalls and has a free end pivotally supporting a retention lever so that it is laterally movable from the sidewall and wherein the retention lever is a bell crank type having an inner arm carrying a cartridge engaging roller which is movable along a longitudinal path due to yielding movement of the resilient arm as the retention lever is pivoted between first and second overcenter detent states.

A still further object of this invention is to provide a tape cartridge retaining and ejecting mechanism including a retention lever of a bell crank type wherein an outer arm of the retention lever includes a slot for receiving a link which is connected to the plunger of a solenoid type actuator. The solenoid has a minimum optimum size and a low maximum length of plunger travel for effecting pivoting of the retention lever from a first overcenter detent state to a position slightly past a neutral or equilibrium position. Thereafter the solenoid is deenergized. The additional force required to drive the retention lever further and to a second overcenter detent state is applied by a spring force of the resilient arm.

A still further object of this invention is to provide a tape cartridge retaining and ejecting mechanism including a retention lever supported on a floating pivot that resiliently biases the retention lever into cartridge engagement and that is operatively connected by a linkage arrangement to a solenoid plunger which is held retracted by the linkage arrangement after being energized to aid in locking of the cartridge at an eject location. Further, the removal of the cartridge from the chamber releases the resilient arm and the plunger so that the plunger returns to a normally extended position to effect pivotal shifting of the retention lever to a reset position in which it is capable of initially engaging and locking an inserted cartridge into the play location.

Further objects and advantages of the present invention will be apparent from the following description, reference being had to the accompanying drawings, wherein a preferred embodiment of the present invention is clearly shown.

DESCRIPTION OF THE PREFERRED EMBODIMENT

Figure 1:
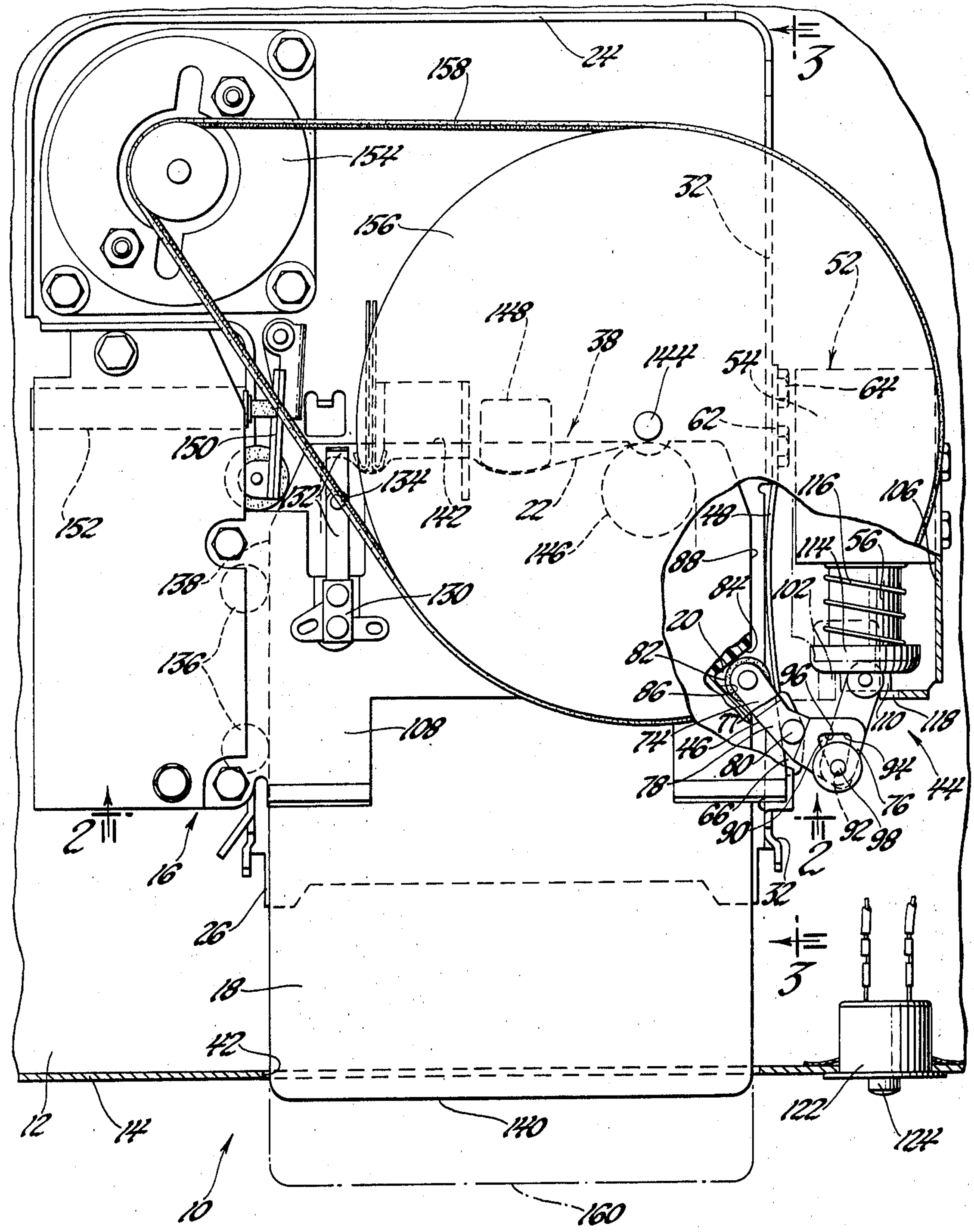
FIG. 1 is a top plan view, with parts broken away, of a tape player having a tape cartridge locked at the play location by a tape cartridge retaining and ejecting mechanism made in accordance with the present invention.

Referring now to the drawings, where the same numeral is used to designate the same or like part throughout the Figures and more particularly to FIG. 1 wherein a tape player is generally designated by the numeral 10. In one preferred embodiment, the tape player 10 is carried in a housing 12 also including a radio receiver, not shown, and adapted for mounting in an automotive vehicle. In this mounting, a front panel 14 of the housing 12 is arranged for substantially coplanar alignment with the vehicle instrument panel.

The tape player 10 includes a tape transport assembly, generally indicated by the numeral 16, and adapted for receiving a tape cartridge such as that designated 18. Tape cartridges of the type including the tape cartridge 18 typically include an index notch 20. A magnetic recording tape 22 is wound in an endless loop configuration within the cartridge 18 and typically includes a plurality of pairs of recorded tracks of stereophonic information across the face thereof.

Figure 2:
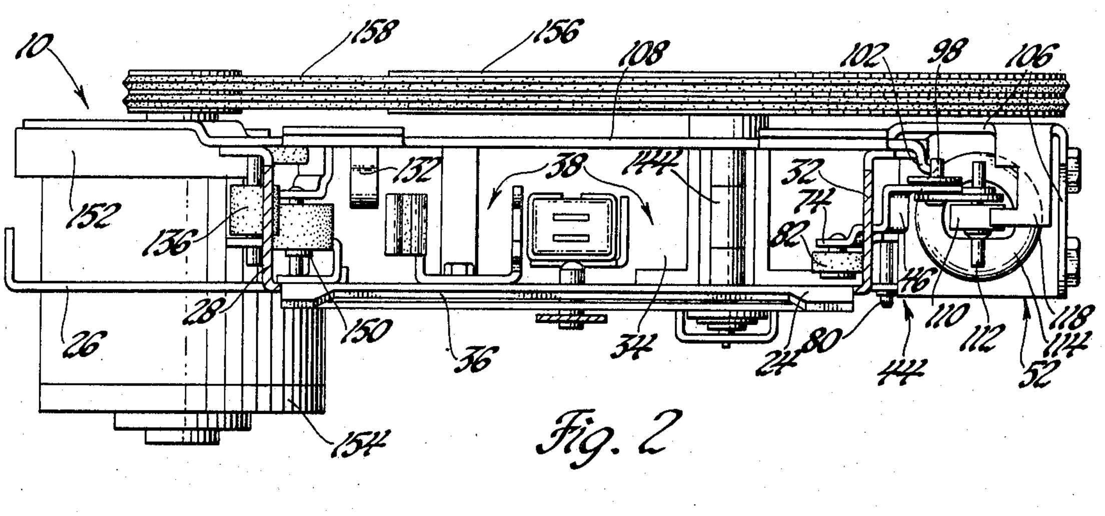
FIG. 2 is an end sectional view through axis 2—2 in FIG. 1.

A frame 24 of the tape transport assembly 16 includes a lower horizontal platform or base plate 26, shown in FIG. 2, supporting a pair of vertical sidewalls 28 and 32 so as to form the bottom and sides, respectively, of a tape cartridge receiving chamber 34. The entrance to the chamber 34 is formed by the fore end 36 of the base plate 26. The tape driving and playing section 38 of the transport assembly 16 is at the rear end of the chamber 34. The tape cartridge receiving chamber 34 is defined by a longitudinal axis extending between the fore end and the rear end and by a lateral axis extending between the left side and the right side. The tape transport assembly 16 is adapted for continuous play of the magnetic tape 22, and for automatic starting and shut-off in response to the positioning of the tape cartridge 18 within the chamber 34.

A tape cartridge retaining and ejecting mechanism, generally designated 44 and forming a principal feature of the present invention, is mounted along the right sidewall 32. The principal parts of the mechanism 44 include a retention lever 46 extending across the sidewall 32 and a resilient arm 48 which pivotally supports the retention lever 46. A remotely operated actuator 52 includes a solenoid 54 having a plunger 56 for pivotally shifting the retention lever 46 through a linkage arrangement including a link 58 to position and lock the tape cartridge 18 in either of two locked locations as described in detail hereinbelow.

The resilient arm 48 is formed of an elongated piece of sheet metal material and is mounted in a cantilevered fashion at a fixed end 62 which is fastened to the sidewall 32 by a suitable means such as sheet metal screws 64. The free end 66 of the resilient arm 48 extends over an elongated opening 68 in the right sidewall 32, illustrated best in FIG. 3. The free end 66 extends toward the fore end 36 to the cartridge receiving chamber 34 and terminates at a point forward of the cartridge index notch 20 when the cartridge 18 is at the play location as illustrated in FIG. 1. A pair of vertically spaced tabs 70, which project sidewardly from the free end 66, form a journal for pivotally supporting the retention lever 46.

The resilient arm 48 forms a leaf spring for biasing the free end 66 toward the chamber 34 so that it is resiliently yieldable outwardly from the sidewall 32. A downwardly extending part 72 at the free end 66 is biased against a side edge of the base plate 26, exposed by the sidewall opening 68, when the tape cartridge 18 is removed from the chamber 34.

Figures 3, 4:
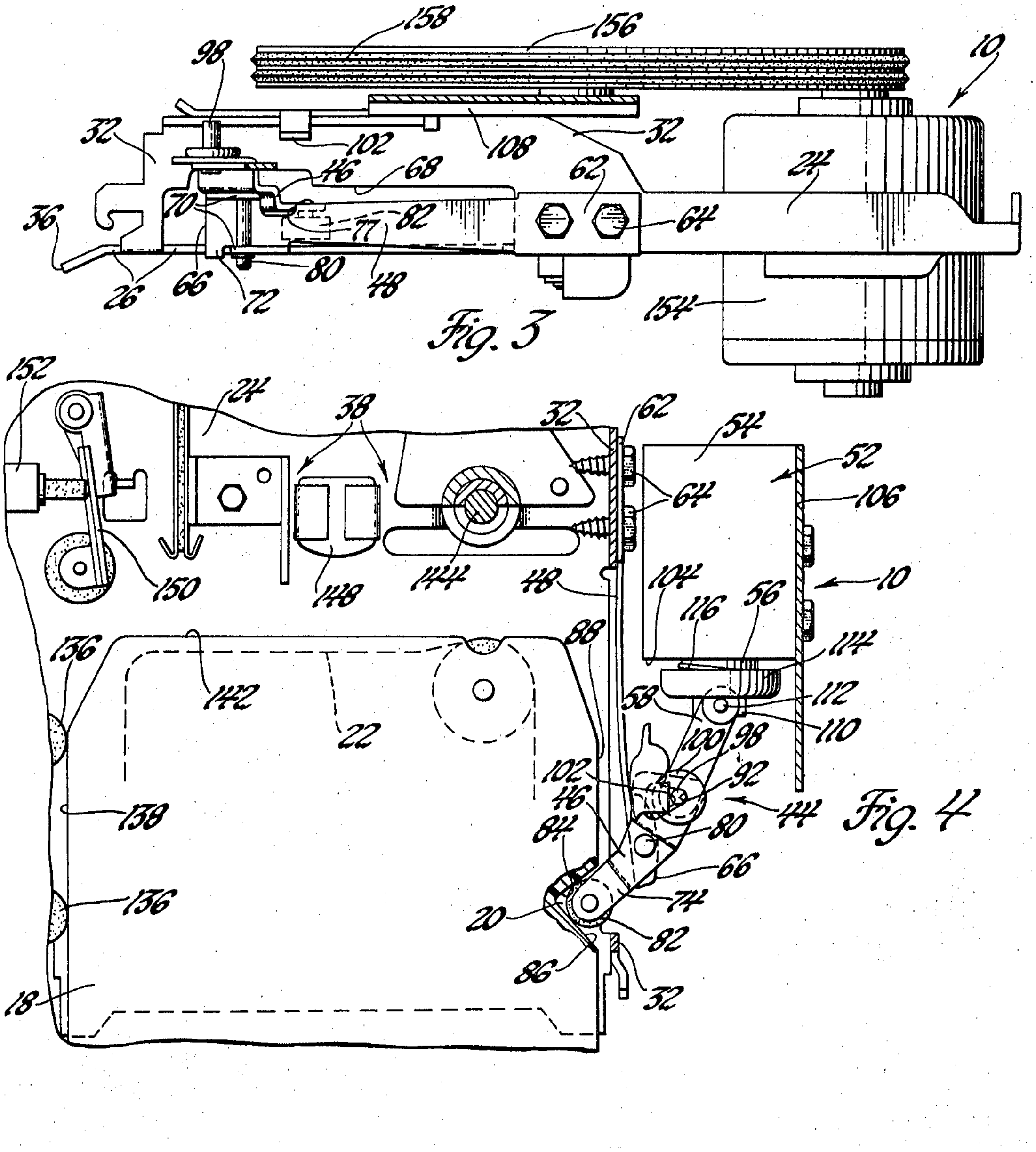
FIG. 3 is a side sectional view through axis 3—3 in FIG. 1.
FIG. 4 is a fragmentary view of FIG. 1 with the parts of the tape cartridge retaining and ejecting mechanism disposed in an operative position for locking the tape cartridge at an eject location.
Figure 5:
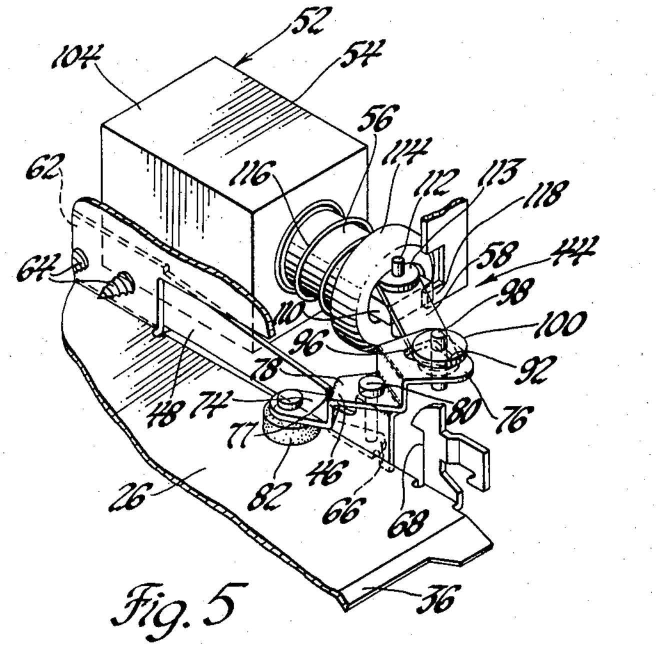
FIG. 5 is a perspective view of the parts of the tape cartridge retaining and ejecting mechanism in a reset position prior to receipt of a tape cartridge.

The retention lever 46 is of a bell crank type including an inner arm 74 which extends transversely through the sidewall opening 68 and into the chamber 34 and an outer arm 76 which extends outside the chamber 34. The fulcrum of the lever is formed at a center section 78. The bottom of the center section 78 rests on the upper tab of the pair of tabs 70 of the resilient arm 48 and includes a downwarldy extending pivot pin 80 rotatably mounted in a pair of aligned holes formed in the pair of tabs 70, as shown in FIGS. 2, 3 and 5. Hence, the inner lever arm 74 is supported at a proximal end for pivotal movement about a proximal axis extending through the pivot pin 80 perpendicular to the longitudinal and lateral axes of the chamber 34. The pin 80 and the tabs 70 form a floating pivot for the retention lever 46 since the free end 66 is movable. The inner lever arm 74 is pivotal toward either the entrance edge 36 or the rear section 38 of the chamber 34 along a longitudinal path as will be hereinafter described.

As shown in FIG. 5, the inner lever arm 74 is slightly offset vertically downward from the center section 78 and terminates at a distal end to which a cartridge engaging roller 82 is rotatably mounted about a distal axis which also extends perpendicular to the longitudinal and lateral axes of the chamber 34. The roller 82 is adapted to engage the V-shaped inclined edges 84 and 86 forming the index notch 20. The inclined edges 84 and 86 are recessed into the sidewall 88 of the tape cartridge 18.

The outer lever arm 76 is slightly offset vertically upward from the center section 78, as shown in FIG. 5, and divergingly tapers to the outer end of the lever so as to extend slightly rearward of the inner lever arm 74. A generally triangularly shaped slot 90 is provided in the outer lever arm 76. The three sides of the slot 90 terminate at round slot corners 92, 94 and 96 illustrated in FIGS. 1, 4, 6, 7 and 8. The slot corners 92, 94 and 96 are formed by substantially circular arcs extending between the slot sides.

Figure 8:
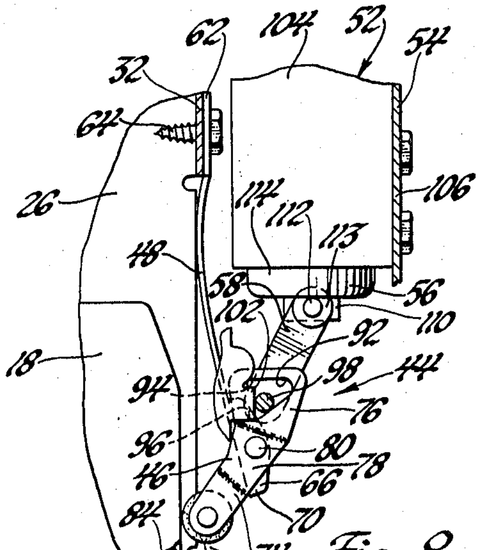
FIG. 8 is a fragmentary view similar to FIG. 6 illustrating the parts of the mechanism in a still further different operative position.

The link 58 is a short flat piece as illustrated in FIG. 5 having a forward end supporting an upward extending link pin 98 which extends through the slot 90. The slot corners 92, 94 and 96 permit complementary engagement with the link pin 98. A circular flange 100 fixed to the link pin 98 extends over the outer lever arm 76 to movably fasten the forward end of the link 58 to the bottom of the outer lever arm 76. The upper end of the link pin 98 is engageable with the end of a forward stop tab formed by projection 102 extending from the sidewall 32 as illustrated in FIG. 4. The forward stop tab projection 102 is also shown in FIGS. 1 and 8. The link 58 has a rearward end pivotally connected to the solenoid plunger 56 as described further hereinafter. A linkage arrangement is formed by the slot 90 and the link 58 for interconnecting a rectilinear movement of the solenoid plunger 56 with combined pivotal and lateral movements of the retention lever 46.

The solenoid 54 includes a housing 104 mounted to the frame 24 by a bracket extension 106 formed integrally with a top plate 108 which extends between the upper ends of the sidewalls 28 and 32 so as to form the top of the chamber 34. The solenoid 54 is located adjacent the sidewall 32 so that the solenoid plunger 56 is reciprocably movable parallel thereto. The width of the housing 104 is limited so as to not extend beyond the transport assembly 16 when mounted adjacent the sidewall 32 while being sufficiently large to retract the solenoid plunger 56 with the required force to initially drive the cartridge 18 from the play location.

Figure 9:
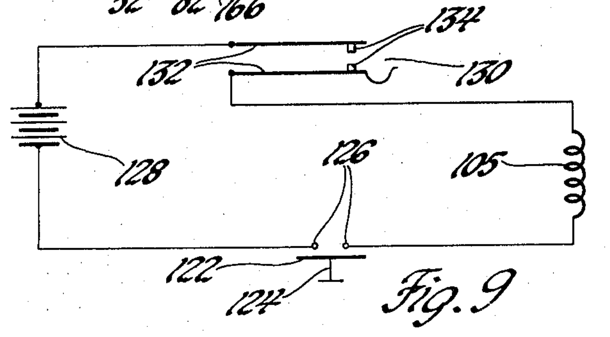
FIG. 9 is a schematic diagram of an electrical circuit utilized to remotely actuate the tape cartridge retaining and ejecting mechanism.

The body of the solenoid plunger 56 is cylindrical and terminates inside the housing 104 in an armature that is electromagnetically actuated by a solenoid coil indicated schematically by numeral 105 in FIG. 9. The outer end of the solenoid plunger 56 includes a rectangular end projection 110 carrying a vertical plunger pin 112. The rearward end of the link 58 rests on top of the plunger end 110 and is journaled on the plunger pin 112. A pin flange 113 secures the link 58 for pivotal movement relative to the solenoid plunger 56.

A cup part 114 having a rectangular aperture is mounted on the plunger end 110 between the plunger pin 112 and the body of the solenoid plunger 56. A coil spring 116 surrounds the plunger body and exerts a separating force between the cup part 114 and the end of the housing 104. The coil spring 116 urges the plunger 56 toward the entrance edge 36 of the chamber 34 to an extended position where the plunger pin 112 is substantially laterally adjacent the roller 82 when the cartridge 18 is at the play location. The bracket extension 106 includes a downwarldy extending plunger stop tab 118 shown in FIGS. 1 and 5. The plunger end 110 abuts the tab 118 to limit the extended travel of the plunger 56 as it is biased out of the housing 104 by the coil spring 116. The solenoid coil 105 is energized in accordance with the operation of the schematic cicuit diagram illustrated in FIG. 9, as described more fully hereinbelow, to retract the plunger 56 rearward and into the housing 104. The cup part 114 abuts the end of the housing 104 at the end of the retracted travel of the solenoid plunger 56.

A cartridge eject switch 122, as illustrated in FIG. 1, is mounted on the front panel 14 of the housing 12. The eject switch 122 includes a push button actuator 124 which is depressed or, alternatively, modified so as to be pulled, to close a pair of switch contacts 126 illustrated schematically in FIG. 9. The pair of contacts 126 are connected in series between the solenoid coil 105 and a direct current electrical source 128, which may be a conventional vehicle battery in the preferred embodiment.

A solenoid disable switch 130, as illustrated in FIG. 1, includes a pair of spring arms 132 extending downwardly from the top plate 108 and into the chamber 34 adjacent the chamber rear section 38. The pair of spring arms 132 carry a pair of contacts 134 adapted to be closed when the forward part of the cartridge 18 forces the spring arms 132 upward into contacting engagement. As illustrated in FIG. 9, the pair of contacts 134 are connected in series with the solenoid coil 105 and the electrical source 128 so that solenoid coil 105 can be energized only while the cartridge 18 biases the pair of contacts 134 closed. During movement of the cartridge toward and away from the chamber rear end 38, the pair of contacts 134 are maintained closed as the cartridge moves between the play location and an intermediate location illustrated in FIG. 7.

Referring now to the operative conditions of the mechanism 44 and the transport assembly 16 when the cartridge 18 is locked at a normal play location in the chamber 34, as illustrated in FIG 1, or at an eject location as illustrated in FIG. 4. THe sidewall 28 carries a pair of aligned guide rollers 136 which register or bear against the side surface 138 of the tape cartridge 18. The cartridge 18 is supported on the base plate 26 in a floating manner as the cartridge engaging roller 82 is biased by the resilient arm 48 against both inclined edges 84 and 86 of the index notch 20. The side surface 138 is forced laterally against the pair of guide rollers 136. When at the play location, the rear surface 140 of the cartridge 18 extends only slightly or is substantially coplanar with the front panel 14 as illustrated in FIG. 1.

The force of the cartridge engaging roller 82 develops a rearwardly directed force component against the inclined edge 84 of the index notch 20 which is greater than a forwardly directed force component against the inclined edge 86 of the index notch 20 to urge the tape cartridge 18 into the chamber rear section 38. The magnetic tape 22 is exposed through windows in a front surface 142 of the tape cartridge 18 so that it is pressed against the capstan spindle 144, which forms a rearward stop, by a pinch roller 146 mounted within the tape cartridge 18. The magnetic tape 22 is also positioned against a magnetic transducer 148 of the two track stereophonic pickup type. The magnetic transducer 148 is elevated relative to the plural pairs of recorded tracks on the magnetic tape 22 by a track shifting mechanism that does not form a part of this invention.

As noted hereinabove, the transport assembly 16 is automatically started upon the tape cartridge 18 being inserted into the play location. This is accomplished by the forward part of the cartridge side surface 138 shifting the roller end of a spring biased lever 150. A tape/-radio switch designated generally by the numeral 152 is actuated by the lever 150 being shifted outwardly of the chamber 34, toward the sidewall 28. Upon being actuated, the tape/radio switch 152 is operative to supply power to a capstan drive motor 154 mounted on the rear of the frame 24, so as to drive a capstan flywheel 156 through a belt 158. The tape/radio switch 152 is further operative to activate circuits not shown including the detecting circuits associated with the magnetic transducer 148, a track shifting mechanism, and is operative to deenergize the radio circuits also contained in the housing 12. Also, with the tape cartridge 18 at the play location the top surface of the forward end of the cartridge 18 biases the solenoid disable switch 130 closed so that the solenoid coil 105 is capable is being energized by actuation of the eject switch 122.

When the mechanism 44 locks the tape cartridge 18 at the play location, the retention lever 46 is in a first overcenter detent state as shown in FIG. 1. The inner lever arm 74 is directed toward the rear end 38 of the chamber 34 and the roller 82 is biased against the inclined edges 84 and 86 by the resilient arm 48. Backed by the support of the guide rollers 136 acting on the cartridge 18, the inclined edges 84 and 86 force the roller 82 sideward to flex the free end 66 outward from the sidewall 32. The reaction spring force which is developed by the resilient arm 48 in this flexed condition causes the retention lever 46 to direct a rearward force component on and a sideward force component on the inclined edge 84 and to direct a forward force component and sideward force component on the inclined edge 86. The rearward force component exceeds the forward force component to press pinch roller 146 against the rearward stop formed by the capstan spindle 144. Concurrently the two sideward force components combine to press the cartridge side surface 138 against the pair of guide rollers 136. Thus, the cartridge 18 is locked in the play location.

When the retention lever 46 is in the first overcenter detent state, the link pin 98 is slightly movable and does not exert a force against the sides or corners of the slot 90 and the solenoid plunger 56 is in the extended position. Accordingly, the resilinet arm 48 applies the sole biasing force to securely lock the cartridge 18 at the play location.

The mechanism 44 also locks the cartridge 18 at an eject location as illustrated in FIG. 4 when the retention lever 46 is in a second overcenter detent state. In this condition the inner lever arm 74 is directed toward the fore end 36 of the chamber 34. Since the free end 66 of the resilient arm 48 is forced outward from the sidewall 32, the cartridge engaging roller 82 is maintained in engagement with the inclined edges 84 and 86 and the cartridge side surface 138 is biased against the pair of guide rollers 136. At this eject location, the cartridge 18 is only partially inserted into the chamber 34 with the cartridge front surface 142 spaced from the chamber rear section 38, so that the magnetic tape 22 and the pinch roller 146 are released from the capstan spindle 144. The solenoid disable switch 130 and the tape/radio switch 152 are also in a released condition by disengagement from the forward part of the cartridge 18. Therefore, the transport assembly 16 is shut-off due to the deenergization of the motor 154 and the aforementioned circuits. The cartridge 18 is displaced from the play location when at the eject location so as to extend from the front panel 14 as indicated by phantom line 160 in FIG. 1. This exposes the cartridge rear surface 140 sufficiently for manual grasping and removal from the tape player 10.

The retention lever 46 is held in the second overcenter detent state by the inward biasing force of the resilient arm 48 which causes the inner lever arm 74 to direct a forward force component and a sideward force component against the inclined edge 86 and a rearward force component and a sideward force component against the inclined edge 84 of the index notch 20. The forward force component exceeds the rearward force component to clamp the link pin 98 between the slot corner 92 and the forward stop formed by the tap projection 102 as shown in FIG. 4. The solenoid plunger 56 is in a retracted position so that the cup part 114 is immediately adjacent the end of the housing 104, and, accordingly, the link 58 is shifted to a rearward position. The coil spring 116 is compressed between the cup part 114 and the end of the housing 104. This exerts a strong biasing force through the plunger pin 112 and the link 58 to the link pin 98. The force of the coil spring 116 biases the link pin 98 against the slot corner 92 but the link pin force cannot rotate the outer lever arm 76 in a clockwise direction, as viewed in FIG. 4, since it is opposed by the engagement of the cartridge engaging roller 82 with the inclined edges 84 and 86. The resilient arm 48 tends to rotate the inner lever arm 74 counterclockwise. However, this is opposed by engagement of the slot corner 92 against the link pin 98 which in turn is clamped against the forward stop formed by the tab projection 102.

In one preferred embodiment, the cup part 114 is spaced slightly from the end of the housing 104 when the retention lever 46 is in the second overcenter detent state. Accordingly, there is a slight "play" to permit further retracting travel by the solenoid plunger 56 for purposes described further hereinbelow. With the coacting relationship of the parts of the mechanism 44 as described above, the retention lever 46 is maintained in the second overcenter detent state and the cartridge engaging roller 82 is forced against the inclined edges 84 and 86 of the index notch 20 so as to resist movement of the cartridge 18 either forward or rearward in the chamber 34 and to press the sidewall 138 of the cartridge 18 against the guide rollers 136. Accordingly, the cartridge 18 is securely locked at the eject location until manually removed or reinserted. This prevents accidental movement, rattling or discharging of the tape cartridge 18 from the chamber 34 by impact or vibrations as may be experienced by use in an automotive vehicle.

Referring now to the tape cartridge retaining and ejecting mechanism 44, as the parts are operatively moved with the cartridge 18 moving into the play and eject locations, the retention lever 46 has a reset position as shown in FIG. 5 prior to the insertion of the cartridge 18 into the chamber 34. The reset position of the parts corresponds to a cartridge load or overcenter rest condition since they are generally oriented to receive the cartridge 18 into the chamber 34. The inner lever arm 74 is directed toward the chamber rear section 38. This positions the cartridge engaging roller 82 inwardly adjacent the position it assumes when received by the index notch 20.

The free end 66 of the resilient arm 48 is biased into the sidewall opening 68 and against the edge of the base plate 26. The solenoid plunger 56 is in the extended position against the plunger stop tab 118 due to the force of the coil spring 116 and the link 58 is in its forwardmost position. The link pin 98 is loose within the slot 90. The retention lever normally remains in this reset position since pivotal movement of the inner lever arm 74 toward the fore end 36 of the chamber 34 is opposed when counterclockwise movement of the outr lever arm 76 causes engagement of the slot corner 92 with the link pin 98. Accordingly, further counterclockwise movement of the outer lever arm 76 will be opposed by the force of the coil spring 116.

When the cartridge 18 is inserted through the cartridge opening 42 in the front panel 14, it is aligned with the chamber 34 and initially enters therein as it slides onto the base plate 26 and past the fore end 36. The cartridge side surface 138 engages the forward one of the pair of guide rollers 136 and the cartridge engaging roller 82 is urged from the rest condition, as shown in FIG. 5, outwardly by the forward part of the cartridge side surface 88. More specifically, the retention lever 46 is pivoted clockwise about the pin 80 such that the inner lever arm 74 engages a cocking shoulder 77 formed in the resilient arm 48. Further movement of the cartridge 18 rearward within the chamber 34 flexes the free end 66 of the resilient arm 48 outward so that the outer lever arm 76 is shifted laterally away from the sidewall 32 to cock the toggle mechanism provided by the resilient arm 48 and the retention lever 46. This shifts the forward end of the link 58 and the link pin 98 outward and generally adjacent the slot corner 92. This develops a reaction spring force in the resilient arm 48 so that as the inclined edge 84 slides adjacent the roller 82, it quickly snaps into the index notch 20. The retention lever 46 is then in the first overcenter detent state to lock the cartridge 18 in the play location as illustrated in FIG. 1. As described hereinabove, the radio/tape switch 152 and the solenoid disable switch 130 are actuated by the forward part of the cartridge 18 and the tape player 10 is then operable to transport and play the magnetic tape 22 without further attention.

Figure 6:
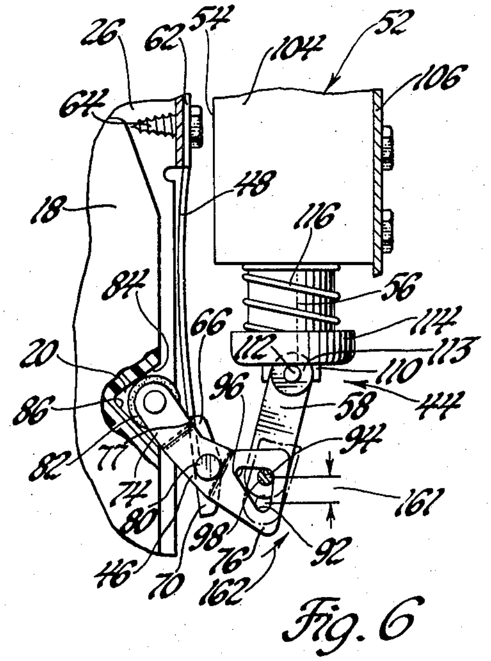
FIG. 6 is a fragmentary view of the tape player shown in FIG. 1 with further parts broken away illustrating the tape cartridge retaining and ejecting mechanism in a different operative position.

When it is desired to terminate playing of the magnetic tape 22, the push button actuator 124 of the eject switch 122 is depressed, thereby closing the pair of contacts 126 illustrated in FIG. 9. THe electrical source 128 is then connected to the solenoid coil 105 whereupon the solenoid plunger 56 begins retracting into the housing 104. The link pin 98 is drawn rearward from the area of the slot 90 adjacent the slot corner 92 into engagement with the slot corner 94 as illustrated in FIG. 6. During the initial retracting movement of the solenoid plunger 56, there is a lost motion relationship between the link 58 and the outer lever arm 76 as the link pin 98 shifts through the distance 161. The solenoid coil 105 continues retracting the solenoid plunger 56 so that the link pin 98 is driven against the slot corner 94 and the outer arm 76 is pivoted counterclockwise as indicated by arrow 162. The inner lever arm 74 is pivoted from the first overcenter detect state toward the fore end 36 of the chamber 34. This causes the roller 82 to press more heavily against the inclined edge 86 than the inclined edge 84 to begin forward longitudinal movement of the cartridge 18 from the chamber rear section 38.

As this occurs, the roller 82 is maintaining a lateral force against the inclined edges 84 and 86 so that it continues a rolling engagement with the pair of guide rollers 136. The forward longitudinal movement of the roller 82 is substantially parallel to the sidewall 32 as the lever pin 80 is forced sidewardly from the sidewall 32 against the spring force of the resilient arm 48. This causes the free end 66 of the resilient arm 48 to act as a floating pivot as it is flexed substantially outward away from the sidewall 32.

Figure 7:
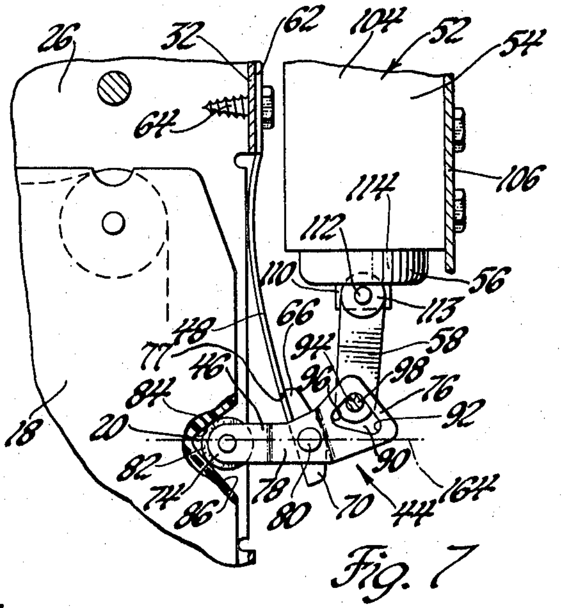
FIG. 7 is a fragmentary view similar to FIG. 6 illustrating the parts of the mechanism in a further different operative position.

The solenoid plunger 56 continues to pull the link 58 rearward pivotally driving the inner lever arm 74 until it reaches a position slightly forward of an equilibrium position as shown in FIG. 7. A neutral axis 164 extends at a right angle to the sidewall 32 and when the inner lever arm 74 is centered with the neutral axis 164 it is in the equilibrium position in which the pivot axes of the roller 82 and the lever pin 80 are aligned therewith. More particularly, when the lever arm 74 is in the equilibrium position, the distal axis about which the roller 82 is pivotally mounted at the distal end of the lever arm 74 is laterally aligned with the proximal axis of the pin 80 about which the proximal end of the lever arm 74 is mounted. The resilient arm 48 is flexed at a maximum distance from the sidewall 32 when the inner lever arm 74 is in the neutral or equilibrium position. The plunger 56 reaches the end of its retracting travel after the inner lever arm 74 passes the neutral axis 164 as shown in FIG. 7. Concurrently, the tape cartridge 18 reaches a predetermined intermediate location which releases the pair of contacts 134 of solenoid disable switch 130 and releases the lever 150 to release the tape/radio switch 152. The pair of contacts 134 and switch 152 remain operated during movement of the cartridge 18 from the play location and until immediately adjacent the intermediate location. The solenoid 54 must continue to apply a counterclockwise pivoting force on the retention lever 46 until it is pivoted past the neutral axis 164, since if it is removed when the inner lever arm 74 is centered with this axis, the roller 82 will apply equal forward and rearward force components to each of the inclined edges 84 and 86. The cartridge 18 will then have only two sideward force component applied to it, and it would remain stationary.

It is seen that the solenoid coil 105 is energized for only a brief cycle of operation as the retention lever 46 pivots from the first overcenter detent state and slightly past the neutral axis 164 due to the driving movement of the solenoid plunger 56 between its extended and retracted positions. The short energization cycle protects the solenoid coil 105 from developing substantial heat that may cause damage to the tape player parts and prevents inadvertent continued energization if the eject switch 122 is continually operated. The length of retracting travel of the solenoid plunger 56 between the positions shown in FIGS. 6 and 7, is approximately 0.4 inch. This permits the size of the solenoid 54 to be kept to a minimum when operating the parts of the mechanism 44 so that the cartridge 18 is ejected approximately 0.7 inch.

When the mechanism 44 reaches the condition shown in FIG. 7, a first toggling action commences so as to continue to eject the cartridge 18. At this condition, the counterclockwise pivoting force of the solenoid 54 has terminated but the resilient arm 48 is effective to continue the application of a counterclockwise pivoting force on te retention lever 46. At the beginning of this toggling action, the distal end of the inner lever arm 74 is forward of the neutral axis 164 and the free end 66 of the resilient arm 48 is flexed outward near its maximum distance from the sidewall 32. The link pin 98 continues engagement with the slot corner 94 so that it has an outward side position which is in spaced alignment with the tab projection 102. Prior to the position of the link pin 98 illustrated in FIG. 7, the link pin 98 is forward of the tab projection 102. During the toggling action, the resilient arm 48 forces the roller 82 against the inclined edge 86 and the sides of the slot 90 rotate relative to the link pin 98. A brief lost motion relationship exists between the outer lever arm 76 and the link pin 98 as the roller 82 continues to travel in a path substantially parallel to the sidewall 36 as defined by the guide rollers 136.

The outer lever arm 76 continues counterclockwise movement and the slot side between slot corners 92 and 94 slides along the link pin 98 driving it inward toward the tab projection 102. This occurs as the retention lever 46 is pivoted and also moves laterally inward toward the chamber 34 due to the floating pivot provided by the free end 66. The slot corner 92 engages the link pin 98 and drives it against the end of the tab projection 102 as shown in the FIG. 4. This prevents any further pivotal movement of the inner lever arm 74 toward the fore end 36 of the chamber 34. The retention lever 46 is locked in its second overcenter detent state, shown in FIG. 4, and the cartridge 18 is in the eject location so that the rear surface 140 is in a partially inserted condition indicated by the phantom line 160. As noted hereinabove, the mechanism 44 is conditioned when holding the cartridge 18 at the eject location for direct reinsertion to the play location or removal from the tape player 10. At this location, the rear surface 140 is exposed sufficiently so that it can be manually grasped for removal.

The tape cartridge 18 is locked at the eject location illustrated in FIG. 4 by the mechanism 44 since the retention lever 46 is locked in the second overcenter detent state as described hereinabove. The lever pin 80, link pin 98, and plunger pin are substantially aligned and the plunger cup part 114 is slightly spaced from the end of the housing 104. It is noted that the solenoid plunger 56 is slightly released from the fully retracted position which occurs when the solenoid coil 105 is initially deenergized.

FIG. 8 illustrates the operative condition of the mechanism 44 as the cartridge 18 is manually removed from the tape player 10 and from the eject location shown in FIG. 4. As the cartridge 18 is withdrawn from the chamber 34, the roller 82 rolls out the inclined edge 84 of the index notch 20 causing the retention lever 32 to be pivoted further counterclockwise and moved out sidewardly on the floating pivot of the free end 66 of the resilient arm 48. As the free end 66 is flexed, the link pin 98 will remain biased against the tab projection 102 by the side of the slot 90 between the corners 92 and 96 as it continues sliding engagement with the link pin 98. Initially, the linkage arrangement between the slot 90, the link pin 98, and the solenoid plunger 56 is released from a lock-up condition as the solenoid plunger 56 is retracted slightly back into the fully retracted position. This prevents the rearward movement of the outer lever arm 76 from binding the slot corner 92 into tighter engagement with the link pin 98 which would occur if it were prevented from moving slightly rearward by a fully retracted solenoid plunger 56.

A lost motion relationship occurs between the link pin 98 and the outer lever arm 76 as the slot corner 92 disengages from the link pin 98 and the retention lever 46 is pivoted counterclockwise as indicated by arrow 166 due to the cartridge movement.

As the forward part of the tape cartridge 18 passes the roller 82, the inner lever arm 74 begins to pivot clockwise and sidewardly back into the chamber 34 as the free end 66 of the resilient arm 48 is released to move toward the sidewall 32. Also, the link pin 98 slides from the end of the stop tab projection 102 as the link 58 is forced forward by the plunger 56 being forced toward the extended position by the compressed coil spring 116. It is important that the free end 66 "floats" sidewardly inward due to the force of the resilient arm 48 since this moves the lever pin 80 inward so that the link pin 98 does not remain positioned inside of a line intersecting the lever pin 80 and the plunger pin 112 as it is positioned in FIG. 8. If the link pin 98 was not outside this line, the linkage arrangement would lock up in an overcenter condition with the solenoid plunger 56 forcing the link pin 98 into the slot corner 96 and holding the link pin 98 at the overcenter inside position so that the inner lever arm 74 remains directed toward the fore end 36 of the chamber 34. After the resilient arm 48 and the solenoid plunger 56 are released, the link pin 98 engages the slot side between the slot corners 92 and 96 so that the force of the coil spring 116 shifts the inner lever arm 74 directly to the reset position illustrated in FIG. 5. The solenoid plunger 56 is then in engagement with the stop tab 118.

Referring again to the condition of the mechanism 44 as shown in FIG. 4, the mechanism 44 is also conditioned for direct reinsertion of the cartridge 18 back again into the play location. To reinsert the cartridge 18, the cartridge rear surface 140, which is at the position of the phantom line 160, is manually forced toward the rear end 38 of the chamber 34. The inclined edge 86 of the index notch 20 is pressed rearward against the roller 82 to move the distal end of the lever arm 74 rearward along a longitudinal path defined by the cartridge bearing against the guide rollers 136. As a result, the inner lever arm 74 is pivoted clockwise against the action of the spring force applied by the resilient arm 48. This urges the lever pin 80 and, accordingly, the free end 66 of the resilient arm 48 laterally outward from the sidewall 32. The outer lever end 76 is moved in a lost motion relationship to the link pin 98 such that the slot corner 92 is moved out of engagement with the link pin 98 and thereafter the slot side between the slot corners 92 and 96 slides along the link pin 98 as the link 58 moves slightly forward due to the force of the coil spring 116. As the retention lever 46 is pivoted toward the neutral axis 164, the free end 66 is forced outward from the sidewall 32 and the slot corner 96 will reach engagement with the link pin 98 so that it is shifted outward and forward of the tab projection 102.

As the cartridge 18 continues to be reinserted into the chamber 34, the lever inner arm 74 begins to pass the neutral axis 164 in a clockwise direction and a second toggling action occurs. The compressed coil spring 116 adds to the spring force developed by the resilient arm 48, although the spring force of the coil spring 116 is not necessary for proper operation of the mechanism 44. The combined spring forces act on the roller 82 to develop a rearward force component against the inclined edge 84 which is larger than the forward force component acting against the inclined edge 86 to drive the cartridge 18 toward the chamber rear section 38. This toggling action causes the link pin 98 to slip outward from the slot corner 96 to the slot corner 92. The coil spring 116 continues extending the solenoid plunger 56 and acts through the link 58 and the link pin 98 to pivot the outer lever arm 76 in a clockwise direction. Accordingly, the retention lever 46 quickly snaps into the first overcenter detent state where it locks the tape cartridge 18 at the play location. The magnetic tape 22 is positioned at the chamber rear section 38 and the tape player 10 is again operative for playing. This occurs since the tape/radio switch 152 is operated as the cartridge passes the intermediate location shown in FIG. 7. Also, the solenoid disable switch 130 is operated so as to enable the electrical circuit shown in FIG. 9 to eject the cartridge 18 when the eject switch 122 is operated as described hereinabove.

While the embodiment of the present invention as herein described constitutes a preferred form, it is understood that other forms may be adopted in accordance with this invention.

What is claimed is:

1. A tape cartridge retaining and releasing mechanism for tape players including a tape transport assembly carrying tape driving and playing parts at a rear section of a chamber having a pair of opposing sidewalls extending between said rear section and a chamber entrance, said chamber being adapted to receive a tape cartridge having a recessed index notch facing one of said pair of sidewalls for registering said cartridge at either a playing location for engagement with said parts or at a nonplaying location spaced from said parts for positioning said cartridge for removal from said chamber, said mechanism comprising: a resilient arm having a fixed end and a free end, said fixed end mounting said resilient arm in a cantilever relationship to said one sidewall so that said free end terminates at a position forward of the position of the index notch of a tape cartridge positioned at said playing location; a retention lever of the bell crank type having first and second lever arms and a center section between said first and second lever arms pivotally connected to said free end, said second lever arm extending outwardly from said one sidewall, said first lever arm extending into said chamber for movement therein so as to be directed toward either said rear section or said chamber entrance; means including an abutment located on the resilient arm and an abutment located on the first lever arm such that as a tape cartridge is initially inserted into the chamber the cartridge contacts the end of the lever arm to pivot the lever arm relative to the resilient arm to engage the abutment on the lever arm against the abutment on the resilient arm thereby to flex the free end of the resilient arm outwardly to develop a reaction spring force which biases the end of the lever arm into the index notch as the cartridge is further inserted into the chamber, said first lever arm continuing biased engagement with said index notch during movement of said cartridge between said playing and nonplaying locations; said resilient arm and said retention lever developing first and second cooperative toggling actions when said first lever arm is directed toward either said rear section or said chamber entrance, respectively, so that said first lever arm is positioned on either of opposite sides of a neutral pivoting position of said first lever arm, said first and second toggling actions being effective to drive said retention lever into first and second overcenter detent positions to lock said cartridge at said playing and nonplaying locations, respectively; a reciprocably movable plunger carried by said assembly adjacent said one sidewall so that said plunger is movable between extended and retracted positions along said one sidewall; a spring means for normally biasing said plunger to said extended position; a link having a forward end and a rearward end, said rearward end being pivotally connected to said plunger; and means movably connecting said forward end of said link to said second lever arm so that movement of said plunger from said extended position to said retracted position initially pivots said first lever arm from said overcenter detent position and away from said rear section and to a position slightly past said neutral pivoting position in a direction toward said chamber entrance so that thereafter said second toggling action moves said retention lever into said second overcenter detent position to lock said cartridge at said nonplaying location with said link retaining said plunger in the retracted position, and further so that manual reinsertion of said cartridge into said chamber from said nonplaying position moves said first lever arm with said index notch so as to be pivoted away from said chamber entrance and past said neutral pivoting position in a direction toward said rear section such that said plunger is released and said retention lever is driven into said first overcenter detent position by said first toggling action thereby returning said cartridge to said playing location.

2. A tape cartridge retaining and releasing mechanism for tape players including a tape transport assembly carrying tape driving and playing parts at the rearward end of a chamber having a pair of opposing sidewalls with one of said sidewalls having an elongated opening and the other of said sidewalls carrying a pair of aligned guide rollers, said chamber being adapted to receive a tape cartridge having a recessed index notch facing said one sidewall for registering said cartridge at either a playing location for engagement with said parts or a nonplaying location spaced from said parts for positioning said cartridge for removal from said chamber, said mechanism comprising: a resilient arm having a fixed end mounting said resilient arm in a cantilevered relationship to extend along said one sidewall and terminating at a free end positioned adjacent said elongated opening; a retention lever of the bell crank type having first and second lever arms and a center section between said first and second lever arms pivotally connected to said free end; said second lever arm extending outwardly from said one sidewall and including a triangularly shaped slot therein; said first lever arm extending through said elongated opening and terminating within said chamber at a cartridge engaging roller; means including an abutment located on the resilient arm and an abutment located on the first lever arm such that as a tape cartridge is initially inserted into the chamber the cartridge contacts the cartridge engaging roller to pivot the lever arm relative to the resilient arm to engage the abutment on the lever arm against the abutment on the resilient arm thereby to flex the free end of the resilient arm outwardly to develop a reaction spring force which biases the cartridge engaging roller into the index notch as the cartridge is further inserted into the chamber, said cartridge engaging roller continuing biased engagement with said index notch during pivotal movement of said retention lever between first and second overcenter detent positions located on opposite sides of a neutral pivoting position of said first lever arm so as to be effective to bias said tape cartridge against said pair of aligned guide rollers and lock said cartridge at said playing and nonplaying locations, respectively; a tab projection extending from said assembly rearward of said free end and laterally outward of said one sidewall; an actuator including a plunger carried by said assembly adjacent said one sidewall so that said plunger is movable between extended and retracted positions along said one sidewall; a coil spring carried by said plunger for normally biasing said plunger to said extended position so that said plunger is moved to said retracted position in response to operation of said actuator; a link having forward and rearward ends, said rearward end being pivotally connected to said plunger; and means including a pin disposed in said slot of said second lever arm for movably connecting said forward end of said link to said second lever arm so that said pin engages one corner of said slot upon said plunger being initially moved toward said retracted position to effect pivoting movement of said retention lever from said first overcenter detent position against the reaction spring force of said resilient arm and pivot said first lever arm past said neutral pivoting position such that said pin shifts from said one corner of said slot into engagement with a second corner of said slot for clamping said pin against said tab projection thereby terminating the pivoting movement of said retention lever at said second overcenter detent position and further for holding said link so that said plunger is held in said retracted position, whereby said pivoting movement of said retention lever shifts said tape cartridge from said playing location to said nonplaying location whereupon said tape cartridge is locked in a partially inserted position within said chamber.

3. A tape cartridge retaining and releasing mechanism for tape record players including a tape transport assembly carrying tape driving and playing parts and having a pair of sidewalls defining opposite sides of a cartridge receiving chamber adapted to receive a tape cartridge having a recessed index notch facing one of said pair of sidewalls for registering said cartridge at playing and nonplaying locations for engagement and disengagement with said parts, respectively, said mechanism comprising: a resilient arm having a fixed end mounted to said one sidewall and a free end transversely movable relative to said one sidewall; a retention lever having a first lever arm extending into said chamber and a second lever arm including an enclosed slot extending away from said chamber, said retention lever connected intermediate said first and second lever arms to said free end, said first lever arm being pivotally movable so as to be directed toward or away from said tape driving and playing parts; means including an abutment on the resilient arm and an butment on the first lever arm such that as a tape cartridge is initially inserted into the chamber the lever arm is pivoted to engage the abutment on the lever arm with the abutment on the resilient arm thereby to flex the free end of the resilient arm outwardly to develop a reaction spring force which acts to bias the end of the lever arm into the index notch as the cartridge is further inserted into the chamber, said first lever arm continuing said biased engagement during movement of said cartridge between said playing and nonplaying locations; said resilient arm and said retention lever having a cooperative toggling action for forcing said retention lever into either of first and second overcenter detent positions located on opposite sides of a neutral pivoting position of said inner lever arm and being effective to lock said cartridge at said playing and nonplaying locations, respectively; a solenoid including a plunger mounted on said assembly adjacent said one sidewall so that said plunger is movable between extended and retracted positions in parallel relationship thereto; a link having one end pivotally connected to said plunger; and means extending through said slot movably connecting the other end of said link to said outer lever arm so that actuation of said solenoid moves said plunger between said extended and retracted positions to drive said retention lever in opposition to said reaction spring force of said resilient arm so that said retention lever is moved from said first overcenter detent position to pivot said first lever arm slightly past said neutral pivoting position whereupon said plunger reaches said retracted position and concurrently said reaction spring force of said resilient arm is effective to drive said retention lever through said cooperative toggling action and into said second overcenter detent position whereby said cartridge is shifted from said playing to said nonplaying location and is retained in a locked relationship within said tape player.

4. A tape cartridge retaining and releasing mechanism for tape players including a tape transport assembly carrying tape driving and playing parts at the rear section of a chamber having a pair of opposing sidewalls extending forward of said parts to receive a tape cartridge having a recessed index notch facing one sidewall of the pair of sidewalls for registering said cartridge at a playing location for engagement with said parts and at a nonplaying location spaced from said parts for positioning said cartridge for removal from said chamber, said mechanism comprising: a resilient arm having a fixed end and a free end, said fixed end attaching said resilient arm in a cantilevered fashion to said assembly so that said free end is movable sidewardly from said one sidewall; a retention lever having first and second lever arms and center section intermediate said first and second lever arms, said center section being pivotally connected to said free end so that said first lever arm extends into said chamber; means including an abutment on the resilient arm and an abutment on the first lever arm such that as a tape cartridge is initially inserted into the chamber the lever arm is pivoted to engage the abutment on the lever arm with the abutment on the resilient arm thereby to flex the free end of the resilient arm outwardly to develop a reaction spring force which acts to bias the end of the first lever arm into the index notch as the cartridge is further inserted into the chamber and during movement of said cartridge between said playing and nonplaying locations; said resilient arm and said retention lever developing a cooperative toggling action during the movement of said cartridge between said playing and nonplaying locations for driving said retention lever into either of first and second overcenter detent positions located on opposite sides of a neutral pivoting position of said first lever arm, wherein said first and second overcenter detent positions are effective to lock said cartridge at said playing and nonplaying locations respectively; a solenoid mounted to said assembly including a coil, a reciprocally movable plunger, and a spring for urging said plunger toward an extended position so that said plunger is moved to a retracted position in response to energization of said coil; a first switch including a pair of contacts and an actuator for closing said contacts, said first switch being mounted on said tape player so that said actuator is exposed for manual operation; a second switch including a pair of spring arms carrying a pair of contacts having a normally open position, said pair of spring arms being carried by said assembly adjacent said rear section of said chamber so that said pair of spring arms are urged together to close said pair of contacts by said tape cartridge when said tape cartridge is positioned between said playing location and an intermediate location between said playing and nonplaying locations where said tape cartridge is positioned to release said pair of spring arms to open the pair of contacts; a circuit means connecting said pair of said first switch and said pair of contacts of said second switch in series with said coil for energization of said coil when both of said pair of contacts are closed; a linkage arrangement connecting said plunger to said second lever arm so that when said cartridge is in said playing location and upon said actuator being operated to close said pair of contacts of said first switch said plunger is retracted to pivot said retention lever from said first overcenter detent position so that said first lever arm is positioned slightly past said neutral pivoting position and concurrently said tape cartridge is shifted to said intermediate location thereby deenergizing said coil whereupon said cooperative toggling action developed by said retention lever and said resilient arm is effective to pivot said retention lever into said second overcenter detent position and drive said tape cartridge to said non-playing location with said plunger being held in a retracted position by said linkage arrangement, whereby said tape cartridge is locked within said chamber at said nonplaying location and said solenoid is returned to a deenergized state.

5. In a tape player for a tape cartridge defined by opposing front and rear walls where the front wall includes an opening for exposing a portion of the tape which is disposed over a tape support and defined by opposing first and second sidewalls where the second sidewall includes a recess, the combination comprising: housing means including a tape cartridge receiving chamber extending longitudinally from a fore end to a rear end and extending laterally from a first side to a second side such that when the tape cartridge is inserted within the chamber the front wall of the cartridge faces the rear end of the chamber while the rear wall of the cartridge faces the fore end of the chamber and the first sidewall of the cartridge faces the first side of the chamber while the second sidewall of the cartridge faces the second sidewall of the chamber; guide means disposed along the first side of the chamber for bearing against the first sidewall of the cartridge to guide longitudinal movement of the tape cartridge rearward toward the rear end of the chamber or forward toward the fore end of the chamber; spring arm means located on the second side of the chamber and having a free end disposed adjacent the second sidewall of the tape cartridge; lever arm means having a proximal end pivotally connected to the free end of the spring means and having a distal end for pivotal engagement within the recess in the second sidewall of the tape cartridge, the lever means having a length between the distal and proximal ends such that as the distal end of the lever arm means is moved rearward from a position forward of the proximal end of the lever arm means the free end of the spring arm means is deflected outwardly to buildup a spring force which is released as the distal end of the lever arm means is moved to a position rearward of the proximal end of the lever arm means to push the distal end of the lever arm means further rearward thereby pushing the tape cartridge against the guide means and rearward within the chamber and such that as the distal end of the lever arm means is moved forward from a position rearward of the proximal end of the lever arm means the free end of the spring arm means is deflected outwardly to buildup a spring force which is released as the distal end of the lever arm means is moved to a position forward of the proximal end of the lever arm means to push the distal end of the lever arm means further forward thereby pushing the tape cartridge against the guide means and forward within the chamber; tape drive means including a capstan located at the rear end of the chamber to engage against the tape support to stop rearward movement of the tape cartridge at a play position in which the tape is drivingly engaged between the capstan and the tape support and in which the tape cartridge is stably held against the guide means; means including an abutment carried by the lever arm means and an abutment located on the housing means such that as the tape cartridge moves forward within the chamber the lever arm means is pivoted to engage the abutment carried by the lever arm means against the abutment located on the housing means to stop forward movement of the tape cartridge at an eject position in which the rear wall of the cartridge protrudes sufficiently beyond the fore end of the chamber to facilitate complete removal of the cartridge from the chamber and in which the cartridge is stably held against the guide means; and means including an abutment located on the resilient arm and an abutment located on the lever arm means such that as the tape cartridge is initially inserted into the chamber the lever arm means is pivoted by the cartridge to engage the abutment on the lever arm means against the abutment on the spring arm means thereby to flex the free end of the spring arm means outwardly to develop a spring force which acts to dispose the distal end of the lever arm means within the recess in the second sidewall as the tape cartridge is further inserted into the chamber.

6. In a tape player for a tape cartridge of the type defined by opposing front and rear walls where the front wall includes an opening for exposing a portion of the tape which is disposed over a pressure roller and defined by opposing first and second sidewalls where the second sidewall includes a recess, the combination comprising: housing means including a tape cartridge receiving chamber defined by a longitudinal axis extending from a fore end to a rear end and a lateral axis extending from a first side to a second side such that when the tape cartridge is inserted into the chamber the front wall of the cartridge faces the rear end of the chamber while the rear wall of the cartridge faces the fore end of the chamber and the first sidewall of the cartridge faces the first side of the chamber while the second sidewall of the cartridge faces the second sidewall of the chamber; lever arm means having a distal end extending inside of the second side of the chamber and a proximal end extending outside of the second side of the chamber; pivotal coupling means connected to the distal end of the lever arm means for coupling the distal end of the lever arm means for pivotal movement about a distal pivot axis which extends perpendicular to the lateral and longitudinal axes of the chamber when the pivotal coupling means is disposed within the recess in the second sidewall of the tape cartridge; guide means located along the first side of the chamber for bearing against the first sidewall of the tape cartridge to guide longitudinal movement of the cartridge within the chamber either rearward toward the rear end or forward toward the fore end such that the distal pivot axis is constrained to move along a generally longitudinal path within the chamber; pivotal supporting means connected to the proximal end of the lever arm means for supporting the lever arm means for pivotal movement about a proximal pivot axis which extends perpendicular to the longitudinal and lateral axes of the chamber; and retention means located on the second side of the chamber and connected to the pivotal supporting means for defining a generally lateral path extending outward from the second sidewall of the tape cartridge along which the proximal pivot axis is constrained to move as the distal pivot axis is moved along the longitudinal path toward a neutral position in which the distal pivot axis is laterally aligned with the proximal pivot axis, the retention means including a spring connected to the pivotal support arrangement for responding to movement of the proximal pivot axis outward along the lateral path to develop a spring force which is applied through the proximal and distal pivot axes to press the tape cartridge against the guide means and to push the tape cartridge toward the rear end of the chamber as the distal pivot axis is moved to a position rearward of the neutral position and which is applied to press the tape cartridge against the guide means and to push the tape cartridge toward the fore end of the chamber as the distal pivot axis is moved to a position forward of the neutral position; means including a capstan located at the rear end of the chamber for abutting against the pressure roller to stop rearward movement of the tape cartridge at a play position in which the tape is drivingly engaged between the capstan and the pressure roller and in which the tape cartridge is pressingly engaged against the guide means; means including an abutment located on the second side of the chamber for abutting against the lever arm means to stop forward movement of the tape cartridge at an eject position in which the rear wall of the tape cartridge protrudes sufficiently beyond the fore end of the chamber to facilitate complete withdrawal of the cartridge from the chamber and in which the tape cartridge is pressingly engaged against the guide means; and means including an abutment located on the retention means for abutting against the lever arm means as the tape cartridge is initially inserted into the chamber to move the proximal pivot axis outwardly along the lateral path against the action of the spring to develop a spring force which biases the pivotal coupling means within the recess in the second sidewall as the tape cartridge is further inserted into the chamber.

7. In a tape player for a tape cartridge defined by opposing front and rear walls where the front wall includes an opening for exposing a portion of the tape which is disposed over a tape support and defined by opposing first and second sidewalls where the second sidewall includes a V-shaped recess for defining a first recess surface inclined forwardly toward the front wall and outwardly toward the second sidewall and a second recess surface inclined rearwardly toward the rear wall and outwardly toward the second sidewall; the combination comprising: housing means including a tape cartridge receiving chamber extending longitudinally from a fore end to a rear end and extending laterally from a first side to a second side such that when the tape cartridge is inserted within the chamber the front wall of the cartridge faces the rear end of the chamber while the rear end of the cartridge faces the front end of the chamber and the first sidewall of the cartridge faces the first side of the chamber while the second sidewall of the cartridge faces the second side of the chamber; spring arm means located on the second side of the chamber and having a free end disposed adjacent the second sidewall of the tape cartridge; lever arm means having a proximal end pivotally connected to the free end of the spring arm means and having a distal end for contacting both the first recess surface and the second recess surface when the distal end is disposed within the recess in the second sidewall of the tape cartridge, the lever arm means having a length between the distal and proximal ends such that the free end of the spring arm means is deflected outwardly to develop a spring force which acts through the contact between the distal end and the first recess surface to exert a first longitudinal force urging the cartridge toward the rear end of the chamber and a first lateral force urging the cartridge toward the first side of the chamber and which acts through the contact between the distal end and the second recess surface to exert a second longitudinal force urging the cartridge toward the fore end of the chamber and a second lateral force urging the cartridge toward the first side of the chamber where the first longitudinal force exceeds the second longitudinal force when the distal end of the lever arm means is rearward of the proximal end and where the second longitudinal force exceeds the first longitudinal force when the distal end of the lever arm means is forward of the proximal end; guide means located along the first side of the chamber to register against the first sidewall of the tape cartridge for counteracting the total of the first and second lateral forces on the cartridge to prevent lateral movement of the cartridge and to guide longitudinal movement of the cartridge toward the rear end of the chamber when the first longitudinal force exceeds the second longitudinal force and to guide longitudinal movement of the tape cartridge toward the fore end of the chamber when the second longitudinal force exceeds the first longitudinal force; tape drive means including a capstan located at the rear end of the chamber to register against the tape support for counteracting the excess of the first longitudinal force over the second longitudinal force to terminate longitudinal movement of the tape cartridge toward the rear end of the chamber at a play position in which the tape is frictionally engaged between the capstan and the tape support by the excess of the first longitudinal force over the second longitudinal force and in which the second sidewall of the tape cartridge is firmly engaged against the guide means by the total of the first and second lateral forces; means including an abutment located on the lever arm means and an abutment located on the housing means such that as the tape cartridge moves longitudinally toward the fore end of the chamber the abutment on the lever arm engages against the abutment on the housing means for counteracting the excess of the second longitudinal force over the first longitudinal force to terminate lonitudinal movemetn of the tape cartridge toward the fore end of the chamber at an eject position in which the rear wall of the cartridge protrudes sufficiently beyond the fore end of the chamber to facilitate manual removal of the cartridge from the chamber and in which the second sidewall of the cartridge is firmly engaged against the guide means by the total of the first and second lateral forces; and means including an abutment located on the lever arm means and an abutment located on the spring arm means such that as the tape cartridge is initially inserted into the chamber the lever arm means is pivoted by the cartridge to engage the abutment on the lever arm means against the abutment on the spring arm means thereby to flex the free end of the spring arm means outwardly to develop a spring force which acts to dispose the distal end of the lever arm means within the recess in the second sidewall as the tape cartridge is further inserted into the chamber.

* * * * *